United States Patent [19]

Ames

[11] 4,338,230

[45] Jul. 6, 1982

[54] EMULSIFIABLE POLYOLEFIN WAXES PREPARED BY REACTING PIVALOLACTONE AND A POLYOLEFIN WAX CONTAINING CARBOXYL GROUPS

[75] Inventor: William A. Ames, Longview, Tex.

[73] Assignee: Eastman Kodak Company, Rochester, N.Y.

[21] Appl. No.: 276,272

[22] Filed: Jun. 22, 1981

[51] Int. Cl.³ .................. C08L 23/26; C08L 23/30; C08L 23/36; C08L 91/06

[52] U.S. Cl. .................. 549/263; 525/386; 525/378; 525/335; 525/332; 525/328; 525/301; 525/285

[58] Field of Search ............... 525/328, 335, 378, 386; 260/28.5 R, 28 R

[56] References Cited

U.S. PATENT DOCUMENTS

| | | | |
|---|---|---|---|
| 3,480,580 | 11/1969 | Joyner et al. | 525/386 |
| 3,859,385 | 1/1975 | Mainord | 525/386 |
| 3,859,386 | 1/1975 | Mainord | 525/301 |
| 4,028,436 | 6/1977 | Bogan et al. | 525/285 |
| 4,281,087 | 7/1981 | Heuschen et al. | 525/386 |

*Primary Examiner*—Carman J. Seccuro
*Attorney, Agent, or Firm*—Clyde L. Tootle; Daniel B. Reece, III

[57] ABSTRACT

This invention relates to the emulsifiable polyolefin waxes which are prepared by reacting pivalolactone with a polyolefin wax containing carboxyl groups and the process for their preparation whereby the carboxyl groups are converted into carboxylate anions and grafted with pivalolactone to prepare emulsifiable waxes having improved properties. Polyolefin waxes which contain carboxyl groups include oxidized high, medium and low density polyethylene waxes, oxidized ethylene/alpha-olefin waxes, ethylene-acrylic acid copolymer waxes, ethylene-methacrylic acid copolymer waxes and high, medium and low density polyethylene, polypropylene and ethylene/alpha-olefin copolymer waxes which have been grafted or reacted with an unsaturated polycarboxylic component.

20 Claims, No Drawings

EMULSIFIABLE POLYOLEFIN WAXES PREPARED BY REACTING PIVALOLACTONE AND A POLYOLEFIN WAX CONTAINING CARBOXYL GROUPS

Emulsifiable polyethylene waxes are well known in the art. These waxes can be oxidized high, medium and low density polyethylenes, and oxidized ethylene/alpha-olefin waxes. Such waxes can be copolymerized waxes having the carboxyl groups providing emulsifiability in the waxes such as an ethylene-acrylic acid copolymer wax and ethylene-methacrylic copolymer wax. Such waxes can also be polyolefin waxes which have been prepared by grafting or reacted with an unsaturated polycarboxylic component. These grafted or reacted waxes which have acid functionality grafted onto the wax can be prepared by reacting the wax with an unsaturated polycarboxylic component such as maleic anhydride, maleic acid or crotonic acid as disclosed in U.S. Pat. Nos. 3,433,777; 3,480,580; 3,859,385 and 3,859,386.

These emulsifiable waxes are widely used in floor polish compositions, coatings for fruits and vegetables and as textile sizing components. These prior art waxes, however, while useful in many applications, are not completely satisfactory in all such applications. For example in the textile area, in garment manufacture, the sewing needles are operated at such rapid speed that a needle lubricant is required. The prior art low melt, low density emulsifiable polyethylene waxes, when used as textile sizes, become molten by the heat generated by the sewing needles at the high sewing speeds and such waxes do not always perform satisfactorily as lubricants. The emulsifiable oxidized high density polyethylene waxes perform better as needle lubricants because of their greater melting points, however, the viscosity of such higher melting, high density waxes is also greater which is undesirable because generally the higher the viscosity the more difficult it is to produce emulsions of good quality. Moreover, if the viscosity of such high density waxes is lowered, then the softening point is also lowered and the usefulness of the wax can thereby be adversely affected. It would, therefore, be an advance in the state of the art to provide an emulsifiable polyolefin wax having the combination of low viscosity and high softening point.

In accordance with this invention, it has been found that low viscosity emulsifiable polyolefin waxes having high softening points are provided by reacting low viscosity acid functionalized or carboxyl group containing olefin waxes with pivalolactone. Polyolefin waxes which contain carboxyl groups include oxidized polyethylene and ethylene/alpha-olefin waxes, ethylene-acrylic acid waxes, ethylene-methacrylic acid copolymer waxes and polyolefin waxes which have been grafted or reacted with an unsaturated polycarboxylic component. The carboxyl groups are converted into carboxylate anions and grafted with pivalolactone to prepare emulsifiable waxes having the combination of low viscosity and high softening point.

The waxes of this invention are prepared by converting 25 to 100 percent of the carboxyl groups of the wax to carboxylate anions and grafting pivalolactone at these sites. The average length of pivalolactone units grafted to make useful compositions according to this invention depend to some extent on the acid number of the acid functionalized polyolefin wax. Acid number is defined as the number of milligrams of KOH required to neutralize 1 gram of the wax. At an acid number of 16, the average length of pivalolactone units is from 4 to about 20 with 4 to 10 being preferred.

The acid number of the acid functionalized polyolefin prior to grafting should be at least 14. At lower acid numbers, the grafted composition yields poor emulsions. The upper limit of acid number is not critical. Waxes having acid numbers of 50 to 60 may be used. In general, as the acid number is increased, the average length of pivalolactone grafted segments should be reduced. Otherwise the composition will exhibit some of the characteristics of polypivalolactone such as high shrinkage upon cooling from the melt. Even at the higher acid numbers, however, the minimum average number of pivalolactone units grafted at each site should be greater than 3.

The carboxyl group containing grafted waxes has a melt viscosity of 50 to 3000 centipoise at 150° C. and an acid number of about 15 to about 40, preferably about 20-30, and a Gardner color of 7 or less. As noted hereinbefore, the acid number can be modified by the amount of unsaturated polycarboxylic component, the reaction temperature and time. It has been observed that the melt viscosity of the modified or grafted polyethylene wax product increases. This increase in melt viscosity may be due to copolymerization of the wax material with maleic anhydride when this anhydride is used to introduce acid functionality.

The carboxyl group containing oxidized or grafted wax is dissolved in a suitable solvent or diluent. Generally it is desirable to heat the wax/solvent mixture to aid in dissolving the wax. Suitable solvents can be organic materials such as toluene, benzene, xylene and the like. After the wax is dissolved or suspended in the solvent the carboxyl groups are neutralized with alcohol soluble base. Before the pivalolactone is added it is desirable to heat the mixture above 100° C. to remove any water, lower alkyl alcohols or other impurities present. The pivalolactone is then added and allowed to react for a period generally from one to six hours depending on the amount to be reacted with the wax. The reactants are stirred and heating continued to keep the wax dissolved in the diluent. Dry hydrogen chloride is bubbled through the mixture to convert the salts to acid functionality. After the reaction is completed, the product is cooled and solidified and isolated.

The carboxyl group containing waxes are partially neutralized with a tetraalkyl ammonium hydroxide to form a partial salt of the emulsifiable wax polymers. The partially neutralized modified wax, such as polyethylene wax, is then reacted with pivalolactone in an amount of from about 5 to about 40 percent by weight to provide the modified emulsifiable low viscosity wax. If the pivalolactone is used in an amount greater than 40 percent by weight, the grafted polymer exhibits some of the properties of polypivalolactone such as a high shrinkage upon cooling from the melt. If the pivalolactone is used in an amount less than 5 percent by weight, the grafted modified ethylene polymers do not have the necessary elevated softening point.

The carboxyl group containing waxes can be completely neutralized and would provide similar results by the addition of the necessary amount of tetra lower alkyl ammonium hydroxide. The tetra lower alkyl ammonium hydroxide for such complete neutralization would, however, increase the expense without a definitive increase in result. Therefore, only partial neutralization is necessary to provide the grafting sites necessary for the addition reaction with the pivalolactone because the remaining acid groups are reactive chain-transfer sites for polymerization of the lactone. The tetra lower alkyl ammonium hydroxide can be any tetraalkyl ammonium hydroxide where the alkyl groups contain 1 to 10 carbon atoms. Such tetraalkyl ammonium hydroxides include tetramethyl ammonium hydroxide, tetrabutyl ammonium hydroxide and the like. After being partially neutralized, the carboxyl group containing wax is then reacted with pivalolactone to yield grafted ethylene polymer.

The ring and ball softening points (RBSP) and DSC melting points of the emulsifiable polyolefin wax increased with increasing amounts of grafted pivalolactone. The RBSP of a 10.2 percent grafted pivalolactone polyolefin wax was increased from 104° C. to 146° C. The viscosity at 150° C. was increased from 144 to 1560 cp. However, at 177° C. the viscosity was only 112 cp. This indicates that at 150° C., which is only slightly above the melting point of the grafted wax, that the polymerized pivalolactone segments still tend to associate even when in the molten state. Thus, the grafted product has the desirable combination of low viscosity and high softening point.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

A 1-liter, 4-neck round bottom flask fitted with a stirrer, thermowell, trap, condenser, and $N_2$ bubbler arrangement was charged with 100 grams of a low density oxidized polyethylene having a Ring and Ball softening point of 104° C., a density of 0.939, an acid number of 16, a melt viscosity of 144 cp. at 150° C. and a Gardner Scale Color of 2, and 500 ml toluene. The mixture was heated with stirring to dissolve the wax. The wax dissolved at approximately 75° C. The wax was neutralized with 28.4 ml of 1 N tetrabutylammonium hydroxide in methanol. The mixture was heated with stirring to distill water, methanol, and some toluene into the trap. When the base temperature reached 112° C. indicating that all water and methanol had been removed, the solution was cooled to 75° C. Pivalolactone (11.36 grams) was added and allowed to polymerize for 3 hours. Dry hydrogen chloride was bubbled through the mixture to convert the salts to acid functionality. The product was allowed to cool and solidify. It was washed with cold methanol and filtered. It was blended with methanol in a Waring Blendor and filtered again. This operation was repeated twice. After drying, the following properties were determined on the grafted wax.

| | |
|---|---|
| Melt Viscosity at 150° C., cp | = 1,560 |
| Melt Viscosity at 177° C., cp | = 112 |
| Ring and Ball Softening Point, °C. | = 146 |
| Density, g/cm³ | = 0.955 |

EXAMPLES 2-6

Similar pivalolactone grafted compositions were made by polymerizing varying amounts of the lactone onto the low density oxidized polyethylene wax used in Example 1 and ethylene/acrylic acid copolymer wax. The ethylene/acylic acid copolymer has a viscosity of 1300 cp. at 125° C., Ring and Ball softening point of 108° C., density of 0.93 g/cc and an acid number of 40. The experimental techniques used were similar to those described in Example 1. Properties are shown in the following table.

| Composition, | Examples | | | | |
|---|---|---|---|---|---|
| Weight % | 2 | 3 | 4 | 5 | 6 |
| Oxidized Polyethylene | 93.4 | 87.6 | 78.0 | 63.8 | 0 |
| Ethylene/Acrylic Acid Copolymer | 0 | 0 | 0 | 0 | 73.8 |
| Pivalolactone | 6.6 | 12.4 | 22.0 | 36.2 | 26.2 |
| $\overline{DP}_{PVL}$* | 2.5 | 5.0 | 10.0 | 20.0 | 5.0 |
| Properties | | | | | |
| Melt Viscosity, cp | | | | | |
| at 125° C. | 525 | | | | |
| at 177° C. | | 205 | | | |
| at 193° C. | | | 112 | | |
| at 216° C. | | | | 250 | |
| at 204° C. | | | | | 315 |
| Ring and Ball Soft. Point, °C. | 112 | 162 | 181 | >192 | >192 |
| Density, g/cm³ | 0.949 | 0.961 | 0.977 | 0.991 | 0.985 |
| Hardness, 0.1 mm | 3.0 | 2.9 | 0.5 | 0.7 | 1.9 |

*$\overline{DP}_{PVL}$ = Average number of pivalolactone units grafted onto the acid functionalized polyolefin or copolymer wax at each neutralized or partially neutralized acid site.

EXAMPLE 7

This example describes the procedure used to emulsify the wax made in Example 1.

A 300-ml Parr autoclave was charged with 40 grams of the wax, 8 grams of oleic acid, 7 grams of 2-amino-2-methylpropanol, and 40 ml of distilled water. The mixture was heated to 155° C. for 30 minutes. An additional 130 ml of distilled water heated to 105° C. in a second pressure vessel was injected into the 300-ml Parr autoclave with $N_2$ pressure. Stirring was continued as the 300-ml Parr autoclave was cooled to 50° C. The emulsion was filtered through cheese-cloth. It contained no "grit" or large unemulsified particles. The emulsion was opaque, very fluid, and was of good quality.

Similar results are obtained by using a different density oxidized polyethylene wax or copolymer waxes such as ethylene/propylene polyolefin containing more than 70 percent ethylene or an ethylene/acrylic acid copolymer wax or ethylene/methacrylic acid copolymer for the oxidized low density polyethylene wax of Example 1. Similar results are also obtained using different carboxyl group containing polyolefin waxes such as maleic acid modified polyethylene wax, maleic acid modified polypropylene wax, maleic acid modified ethylene/propylene wax, maleic acid modified etylene/higher alpha-olefin waxes and maleic acid modified propylene/higher alpha-olefin waxes. Further, the use of other tetraalkyl ammonium hydroxide components in place of tetrabutylammonium hydroxide also provides similar results.

The compositions of this invention are useful in automobile and floor polishes, textile sizing and fruit coatings.

Although the invention has been described in considerable detail with particular reference to certain preferred embodiments thereof, variations and modifications can be effected within the spirit and scope of the invention.

I claim:

1. An emulsifiable low viscosity modified polyolefin wax prepared by partially or completely neutralizing a low viscosity carboxyl group containing polyolefin wax having a melt viscosity of 50 to 3,000 centipoise at 150° C. and an acid number of at least 14 with at least one tetra lower alkyl ammonium hydroxide thereby converting carboxyl group of said polyolefin wax to carboxylate anions, and reacting the partially or completely neutralized modified polyolefin wax with pivalolactone in an amount of from about 5 to about 40 percent based on the weight of the low viscosity carboxyl group containing polyolefin wax to provide modified polyolefin wax having good emulsifiability and higher softening point.

2. An emulsifiable low viscosity modified polyolefin wax according to claim 1 wherein said low viscosity carboxyl group containing polyolefin wax is a member selected from the group consisting of oxidized low density polyethylene wax, oxidized medium density polyethylene wax, oxidized high density polyethylene wax and oxidized ethylene/alpha-olefin wax.

3. An emulsifiable low viscosity polyolefin wax according to claim 2 wherein said low viscosity carboxyl group containing polyolefin wax is oxidized low density polyethylene wax.

4. An emulsifiable low viscosity modified wax according to claim 3 wherein said tetra lower alkyl ammonium hydroxide is tetrabutylammonium hydroxide.

5. An emulsifiable low viscosity modified polyolefin wax according to claim 1 wherein said low viscosity carboxyl group containing polyolefin wax is a member selected from the group consisting of ethylene-acrylic acid copolymer waxes and ethylene-methacrylic copolymer waxes.

6. An emulsifiable low viscosity polyolefin wax according to claim 5 wherein said low viscosity carboxyl group containing polyolefin wax is ethylene-acrylic acid copolymer wax.

7. An emulsifiable low viscosity modified wax according to claim 6 wherein said tetra lower alkyl ammonium hydroxide is tetrabutylammonium hydroxide.

8. An emulsifiable low viscosity modified polyolefin wax according to claim 1 wherein said low viscosity carboxyl group containing polyolefin wax is a member selected from the group consisting of high, medium and low density polyethylene wax, polypropylene wax, and ethylene/alpha-olefin waxes which have been grafted or reacted with an unsaturated polycarboxylic component.

9. An emulsifiable low viscosity polyolefin wax according to claim 8 wherein said low viscosity carboxyl group containing polyolefin wax is maleated low density polyethylene wax.

10. An emulsifiable low viscosity modified wax according to claim 9 wherein said tetra lower alkyl ammonium hydroxide is tetrabutylammonium hydroxide.

11. An emulsifiable low viscosity modified polyolefin wax prepared by partially or completely neutralizing a low viscosity carboxyl group containing polyolefin wax having a melt viscosity of 50 to 3,000 centipoise at 150° C. and an acid number of at least 14 with at least one tetra lower alkyl ammonium hydroxide thereby converting carboxyl group of said polyolefin wax to carboxylate anions, and reacting the partially or completely neutralized modified polyolefin wax with pivalolactone in an amount of from about 5 to about 40 percent based on the weight of the low viscosity carboxyl group containing polyolefin wax to provide modified polyolefin wax having good emulsifiability and higher softening point.

12. An emulsifiable low viscosity modified polyolefin wax according to claim 11 wherein said low viscosity carboxyl group containing polyolefin wax is a member selected from the group consisting of oxidized low density polyethylene wax, oxidized medium density polyethylene wax, oxidized high density polyethylene wax and oxidized ethylene/alpha-olefin wax.

13. An emulsifiable low viscosity polyolefin wax according to claim 12 wherein said low viscosity carboxyl group containing polyolefin wax is oxidized low density polyethylene wax.

14. An emulsifiable low viscosity modified wax according to claim 13 wherein said tetra lower alkyl ammonium hydroxide is tetrabutylammonium hydroxide.

15. An emulsifiable low viscosity modified polyolefin wax according to claim 11 wherein said low viscosity carboxyl group containing polyolefin wax is a member selected from the group consisting of ethylene-acrylic acid copolymer waxes and ethylene-methacrylic copolymer waxes.

16. An emulsifiable low viscosity polyolefin wax according to claim 15 wherein said low viscosity carboxyl group containing polyolefin wax is ethylene-acrylic acid copolymer wax.

17. An emulsifiable low viscosity modified wax according to claim 16 wherein said tetra lower alkyl ammonium hydroxide is tetrabutylammonium hydroxide.

18. An emulsifiable low viscosity modified polyolefin wax according to claim 11 wherein said low viscosity carboxyl group containing polyolefin wax is a member selected from the group consisting of high, medium and low density polyethylene wax, polypropylene wax, and ethylene/alpha-olefin waxes which have been grafted or reacted with an unsaturated polycarboxylic component.

19. An emulsifiable low viscosity polyolefin wax according to claim 18 wherein said low viscosity carboxyl group containing polyolefin wax is maleated low density polyethylene wax.

20. An emulsifiable low viscosity modified wax according to claim 19 wherein said tetra lower alkyl ammonium hydroxide is tetrabutylammonium hydroxide.

* * * * *